(12) United States Patent
Subash et al.

(10) Patent No.: US 11,943,137 B2
(45) Date of Patent: Mar. 26, 2024

(54) PROACTIVE FLOW PROVISIONING BASED ON ENVIRONMENTAL PARAMETERS OF NETWORK DEVICES

(71) Applicant: Cisco Technology, Inc., San Jose, CA (US)

(72) Inventors: Hemamalini Subash, Alviso, CA (US); David John Zacks, Vancouver (CA); N Shalini Srinivasan, Karnataka (IN); Rashmi Nikhil Patil, Bangalore (IN); Joel Abraham Obstfeld, Bushey (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/721,679

(22) Filed: Apr. 15, 2022

(65) Prior Publication Data

US 2023/0336466 A1 Oct. 19, 2023

(51) Int. Cl.
*H04L 45/00* (2022.01)
*H04L 43/065* (2022.01)
*H04L 45/03* (2022.01)
*H04L 45/28* (2022.01)

(52) U.S. Cl.
CPC .......... *H04L 45/38* (2013.01); *H04L 43/065* (2013.01); *H04L 45/03* (2022.05); *H04L 45/22* (2013.01); *H04L 45/28* (2013.01)

(58) Field of Classification Search
CPC ....... H04L 45/38; H04L 43/065; H04L 45/03; H04L 45/22; H04L 45/28
See application file for complete search history.

(56) References Cited

U.S. PATENT DOCUMENTS

| 6,754,220 | B1 * | 6/2004 | Lamberton | H04L 45/22 714/4.11 |
| 2003/0031180 | A1 * | 2/2003 | Datta | H04L 45/04 370/392 |
| 2004/0203558 | A1 * | 10/2004 | Suzuki | H04L 45/28 455/414.1 |
| 2010/0142369 | A1 * | 6/2010 | Gottwerth | H04L 12/56 370/225 |
| 2012/0250515 | A1 * | 10/2012 | Kakadia | H04L 45/00 370/252 |

(Continued)

*Primary Examiner* — Chris Parry
*Assistant Examiner* — Dixon F Dabipi
(74) *Attorney, Agent, or Firm* — Polsinelli P.C.

(57) ABSTRACT

Systems, methods, and computer-readable media are disclosed for proactively and adaptively rerouting data to a healthier path through network, as part of flow provisioning, based on environmental variables associated with devices in the network. The present technology includes identifying a routing path for forwarding traffic flows in a network, receiving diagnostic data of a routing device on the routing path. The diagnostic data include one or more environmental parameters associated with internal state and surroundings of the routing device. Further, the present technology includes comparing the diagnostic data of the routing device with a predetermined threshold and modifying, prior to a failure of the routing device, the routing path to bypass the routing device for at least a portion of the traffic flows based on the comparison between the diagnostic data of the routing device and the predetermined threshold.

20 Claims, 8 Drawing Sheets

(56) References Cited

U.S. PATENT DOCUMENTS

| | | | | |
|---|---|---|---|---|
| 2014/0247710 A1* | 9/2014 | Goergen | ................ | H04L 45/28 |
| | | | | 370/221 |
| 2019/0386912 A1* | 12/2019 | Huang | ................ | H04L 41/0668 |
| 2020/0007441 A1* | 1/2020 | Pani | .................... | H04L 41/0873 |
| 2021/0409306 A1* | 12/2021 | Neog | ...................... | H04L 45/22 |
| 2022/0006701 A1* | 1/2022 | Patel | ...................... | H04L 41/22 |

* cited by examiner

PROACTIVE FLOW PROVISIONING BASED ON ENVIRONMENTAL PARAMETERS OF NETWORK DEVICES

TECHNICAL FIELD

The subject matter of this disclosure relates in general to the field of computer networking, and more particularly, to systems and methods for proactively and adaptively rerouting data to healthier paths through a network, as part of flow provisioning, based on environmental variables associated with devices in the network.

BACKGROUND

A computer network is a collection of interconnected computing devices that can exchange data and share resources. In packet-based computer networks, the computing devices communicate data by dividing the data into small blocks called packets, which are individually routed across the network from a source device to a destination device. Specifically, each stream of data packets (also referred to as a packet flow) is transferred through the network over a network path from a source device to a destination device. Each network path is defined by a set of nodes, interconnected by a set of links.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
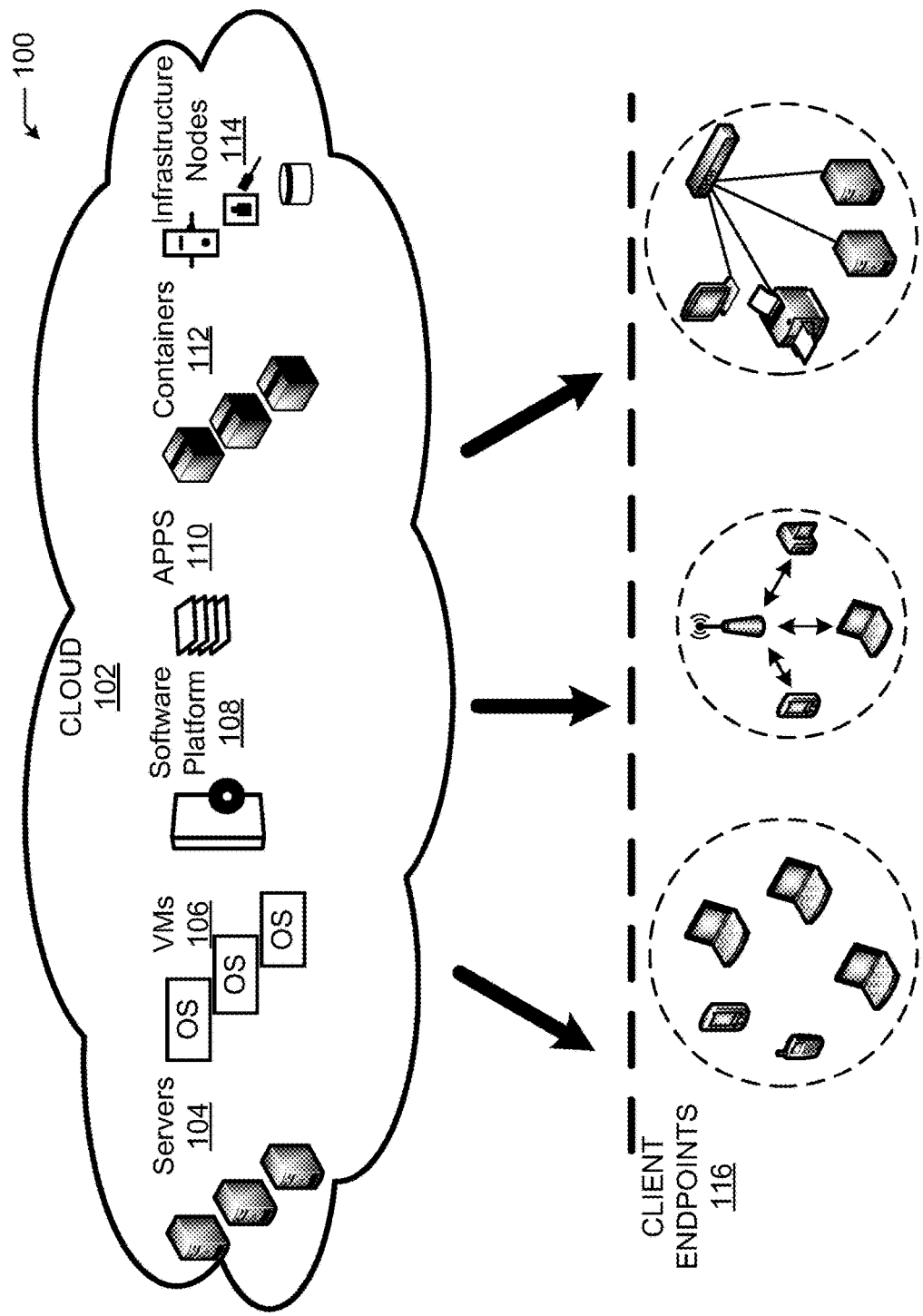
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods, and computer-readable media for proactively and adaptively rerouting data to a healthier path through a network, as part of flow provisioning, based on environmental variables associated with devices.

In one aspect, a method of proactively and adaptively rerouting data includes identifying a routing path for forwarding traffic flows in a network and receiving diagnostic data of a routing device on the routing path. The diagnostic data can include one or more environmental parameters associated with the internal state and surroundings of the routing device. Further, the method includes comparing the diagnostic data of the routing device with a predetermined threshold and modifying, prior to a failure of the routing device, the routing path to bypass the routing device for at least a portion of the traffic flows based on the comparison between the diagnostic data of the routing device and the predetermined threshold.

In another aspect, the method further includes facilitating an exchange of the diagnostic data between a first routing device on the routing path and a second routing device on the routing path based on a link layer discovery protocol (LLDP) extension.

In another aspect, the method includes delivering the diagnostic data of the routing device to other devices in the network based on a Multi-Protocol Border Gateway Protocol (MP-BGP) extension.

In another aspect, the method includes comparing the diagnostic data of the routing device with diagnostic data of other devices in the network and updating a routing protocol in the network based on the comparison between the diagnostic data of the routing device and the diagnostic data of the other devices. The routing protocol can include links between the routing device and the other devices.

In another aspect, the method includes prioritizing subsets of the traffic flows based on a network policy and modifying the routing path for each of the subsets of the traffic flows based on the diagnostic data of the routing device.

In another aspect, the one or more environmental parameters are physical characteristics of the surroundings of the routing device including at least one of a temperature, humidity, an atmospheric pressure, an elevation, an altitude, a wind speed, an airborne particle concentration, a gas concentration, and a combination thereof.

In another aspect, the one or more environmental parameters are electrical characteristics of the routing device including at least one of a power level, a power usage, a voltage, a signal-to-ratio, a temperature of components of the routing device, fan speeds, and a combination thereof.

In another aspect, the one or more environmental parameters are performance characteristics of the surroundings of the routing device including at least one of link errors, packet drops, a duplex mismatch, mismatching optical power levels, and a combination thereof.

In another aspect, the diagnostic data is obtained from one or more sensors distributed on the routing device. In another aspect, the portion of the traffic flows is determined based on a network policy.

In one aspect, a system for proactively and adaptively rerouting data to a healthier path through a network, as part of flow provisioning, based on environmental variables associated with devices includes one or more computer-readable media comprising computer-readable instructions and one or more processors. The one or more processors are configured to execute the computer-readable instructions to identify a routing path for forwarding traffic flows in a network, receive diagnostic data of a routing device on the routing path, compare the diagnostic data of the routing device with a predetermined threshold, and modify, prior to a failure of the routing device, the routing path to bypass the routing device for at least a portion of the traffic flows based on the comparison between the diagnostic data of the routing device and the predetermined threshold. The diagnostic data can include one or more environmental parameters associated with the internal state and surroundings of the routing device.

In one aspect, one or more non-transitory computer-readable media include computer-readable instructions, which when executed by one or more processors, cause the processors to identify a routing path for forwarding traffic flows in a network, receive diagnostic data of a routing device on the routing path, compare the diagnostic data of the routing device with a predetermined threshold, and modify, prior to a failure of the routing device, the routing path to bypass the routing device for at least a portion of the traffic flows based on the comparison between the diagnostic data of the routing device and the predetermined threshold. The diagnostic data can include one or more environmental parameters associated with the internal state and surroundings of the routing device.

DESCRIPTION OF EXAMPLE EMBODIMENTS

Troubleshooting a device in a network can be time-consuming and results in network downtime. Often, its connections to neighboring devices are compared to identify configuration issues, potential software/hardware failures. While routing protocols may identify a connection-level failure, there are many failure scenarios where routing protocols prove to be inadequate. Therefore, there exists a need for a solution, which can not only aid in efficient and quick diagnostics but also re-route the traffic away from the faulty device in order to preserve network service.

Furthermore, commonly and widely used forwarding based on standard switching/routing protocols do not include local or peer environmental health metrics. This may result in unfavorable flow failovers and convergence following critical thresholds being hit and impacted. Accordingly, with growing high speed and density networking gears, there exists a need for environmental health aware forwarding or flow provisioning.

A proposed solution consists of a network in which devices share diagnostic information of other devices, especially the environmental parameters of the devices. More specifically, a proposed solution proactively discover, monitor end-to-end environmental health metrics, and adaptively integrate the metrics as part of flow provisioning and forwarding logic. As follows, it can help proactively steer flows through healthier paths and distribute them away from hot spots or segments.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
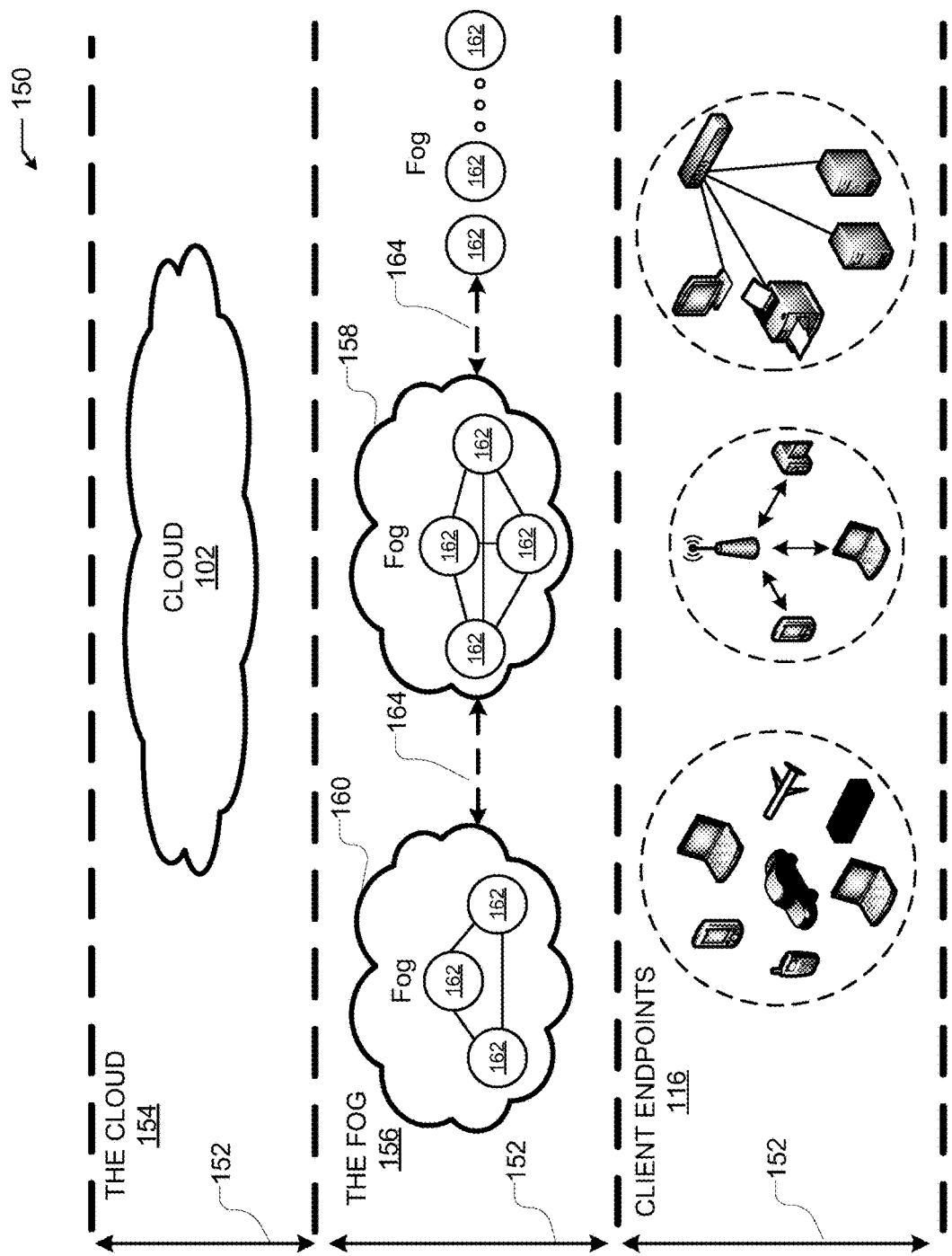
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
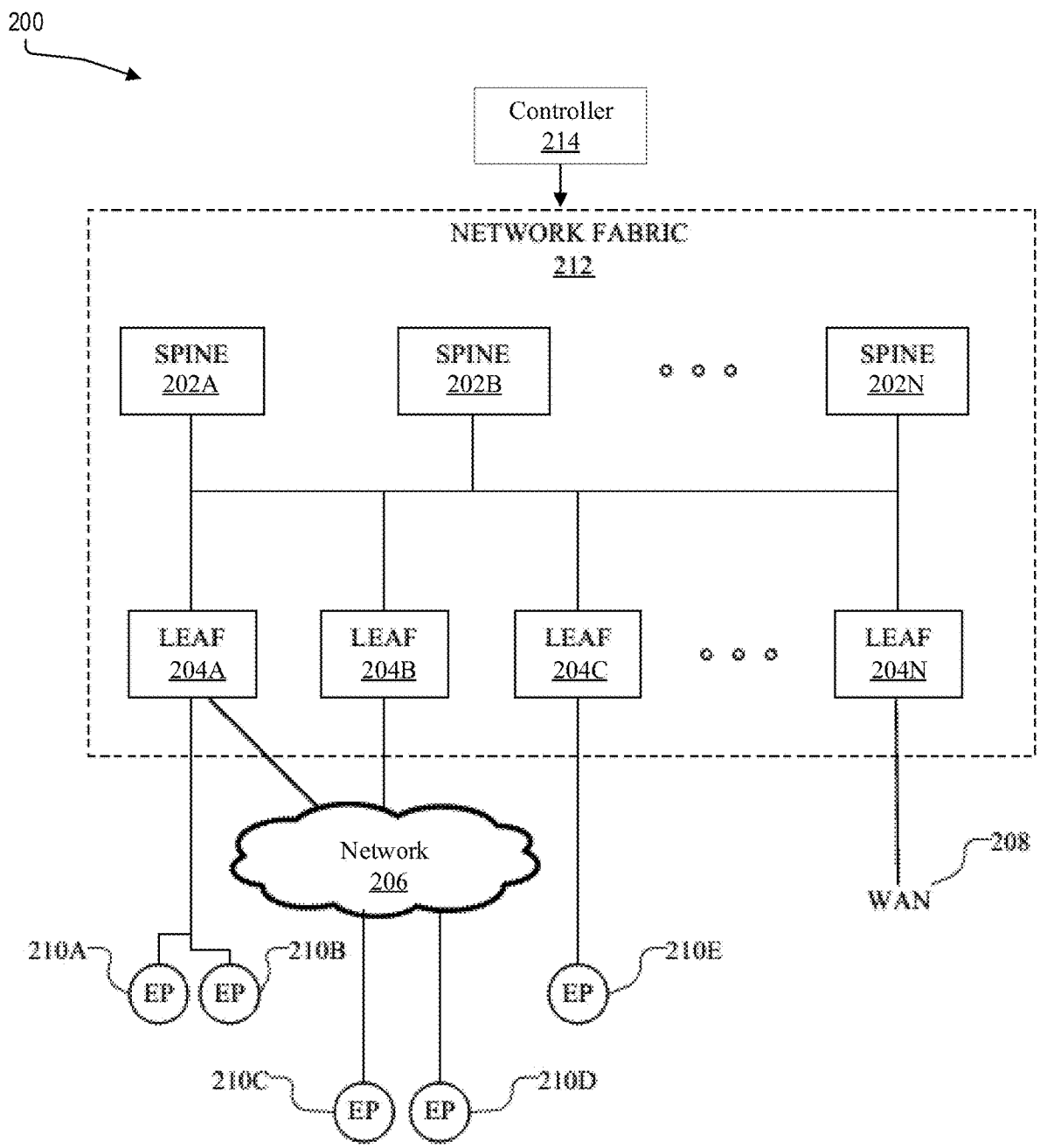
FIG. 2 illustrates a schematic diagram of an example network architecture.

FIG. 2 illustrates a schematic block diagram of an example network architecture 200. In some cases, the architecture 200 can include a data center, which can support and/or host the cloud 102 as illustrated in FIGS. 1A and 1B. Moreover, the architecture 200 includes a network fabric 212 with spine switches 202A, 202B, . . . , 202N (collectively "202") connected to leaf switches 204A, 204B, 204C, . . . , 204N (collectively "204") in the network fabric 212.

Spine switches 202 can be Layer 3 ("L3") switches in the fabric 212. However, in some cases, the spine switches 202 can also, or otherwise, perform Layer 2 ("L2") functionalities. Spine switches 202 connect to leaf switches 204 in the fabric 212. Leaf switches 204 can include access ports (or non-fabric ports) and fabric ports. Fabric ports can provide uplinks to the spine switches 202, while access ports can provide connectivity for devices, hosts, endpoints, VMs, or external networks to the fabric 212.

Leaf switches 204 can reside at the boundary between the fabric 212 and the tenant or customer space. In some cases, the leaf switches 204 can be top-of-rack ("ToR") switches, aggregation switches, end-of-row (EoR), middle-of-row (MoR) switches, etc.

The leaf switches 204 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 204 can contain virtual switching and/or tunneling functionalities, such as a virtual tunnel endpoint (VTEP) function. Thus, leaf switches 204 can connect the fabric 212 to an overlay (e.g., VXLAN network).

Network connectivity in the fabric 212 can flow through the leaf switches 204. The leaf switches 204 can provide servers, resources, endpoints, external networks, or VMs access to the fabric 212, and can connect the leaf switches 204 to each other. In some cases, the leaf switches 204 can connect endpoint groups ("EPGs") to the fabric 212 and/or any external networks. Each EPG can connect to the fabric 212 via one or more of the leaf switches 204, for example.

Endpoints 210A-E (collectively "210") can connect to the fabric 212 via leaf switches 204. For example, endpoints 210A and 210B can connect directly to leaf switch 204A, which can connect endpoints 210A and 210B to the fabric 212 and/or any other of the leaf switches 204. Similarly, endpoint 210E can connect directly to leaf switch 204C, which can connect endpoint 210E to the fabric 212 and/or any other of the leaf switches 204. On the other hand, endpoints 210C and 210D can connect to leaf switch 204A and 204B via network 206. Moreover, the wide area network (WAN) 208 can connect to the leaf switches 204N.

Endpoints 210 can include any communication device, such as a computer, a server, a switch, etc. In some cases, the endpoints 210 can include a server or switch configured with a virtual tunnel endpoint functionality that connects an overlay network with the fabric 212. For example, in some cases, the endpoints 210 can represent hosts (e.g., servers) with virtual tunnel endpoint capabilities, and running virtual environments (e.g., hypervisor, virtual machine(s), containers, etc.). An overlay network associated with the endpoints 210 can host physical devices, such as servers; applications; EPGs; virtual segments; virtual workloads; etc. Likewise, endpoints 210 can also host virtual workloads and applications, which can connect with the fabric 212 or any other device or network, including an external network.

Controller 214 can provide centralized access to fabric information, application configuration, resource configuration, application-level configuration modeling for a software-defined network (SDN) infrastructure, integration with management systems or servers, etc. Controller 214 can define and manage application-level model(s) for configurations in network architecture 200. In some cases, application or device configurations can also be managed and/or defined by other components in the network.

Figure 3:
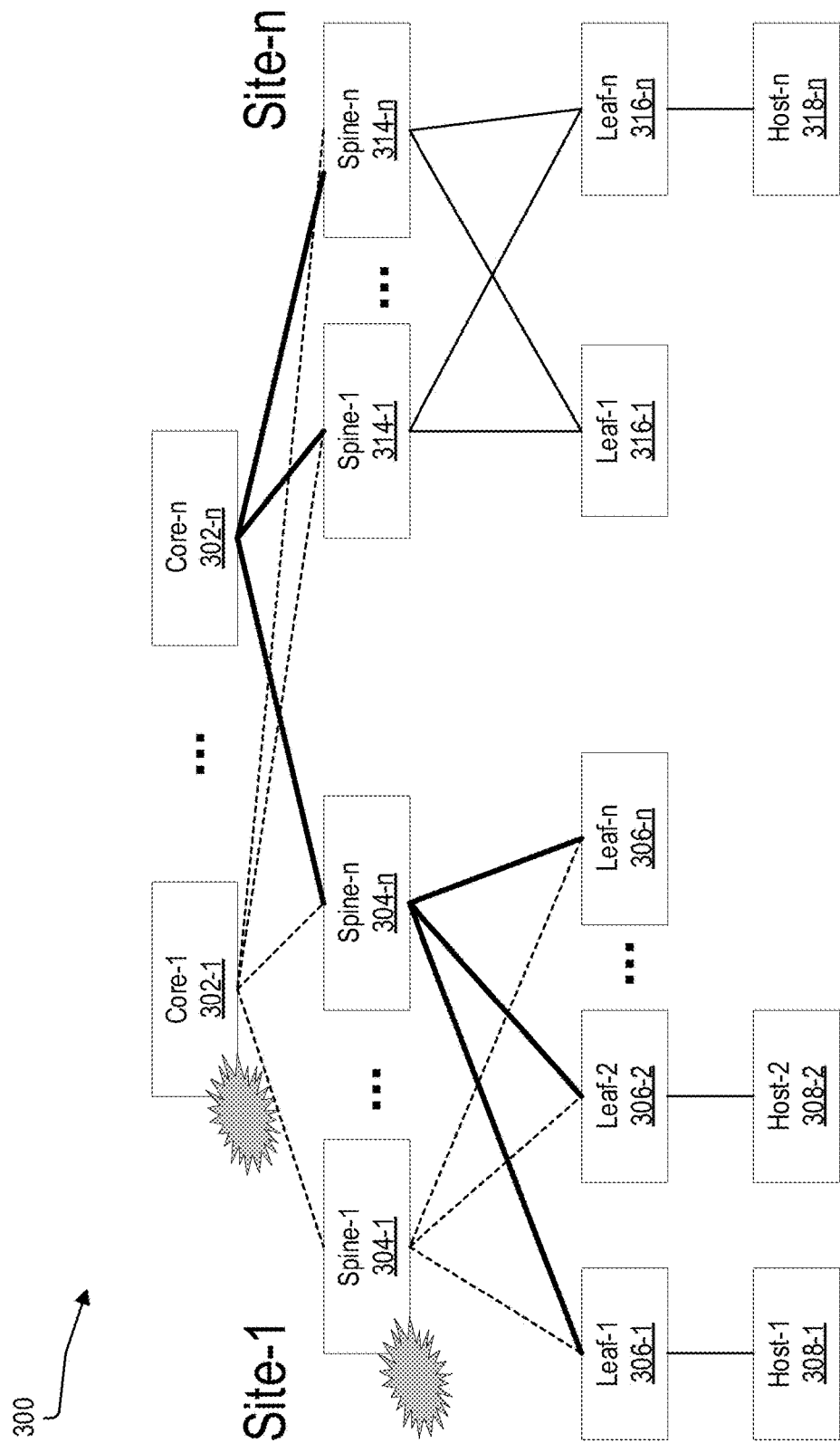
FIG. 3 illustrates an example network environment in which packets are routed over a network path according to some examples of the present disclosure.

FIG. 3 illustrates an example network environment 300 in which packets are routed over a network path according to some examples of the present disclosure. Network environment 300 comprises Cores 302-1, . . . 302-n (collectively, 302), Spines 304-1, . . . 304-n in Site-1 (collectively, 304) and 314-1, . . . 314-n in Site-n (collectively, 314), Leafs 306-1, 306-2, . . . 306-n in Site 1 (collectively, 306) and 316-1, . . . 316-n in Site-n (collectively, 316), and Hosts 308-1, . . . 308-2 in Site-1 (collectively, 308) and 318-n in Site-n (collectively, 318). Cores 302, Spines 304 and 314, Leafs 306 and 316, and Hosts 308 and 318 can include core routers or switches, spine routers or switches, leaf routers or switches, and host routers or switches, respectively, which can be interconnected for routing or switching traffic in network environment 300.

In network environment 300, network connectivity can flow from Cores 302 to Spines 304 and 314 to Leafs 306 and 316 to Hosts 308 and 318, and vice versa. The interconnections between Cores 302, Spines 304 and 314, Leafs 306 and 316, and Hosts 308 and 318 can have multiple interconnections to avoid a failure in routing.

According to some examples, each network path can be defined by a set of nodes, interconnected by a set of links. For example, Core-1 302-1 and Spine-1 304-1 is interconnected by a link, which then is also connected to Leaf-1 306-1 by a link and then to Host-1 308-1 by another link, thereby forming a network path from Core-1 302-1 to Host-1 308-1. Also, as shown in FIG. 3, a network path flows from Core-1 302-1 to Spine-n 304-n to Leaf-n 306-n. Network paths (i.e., data flows) can be hashed to any one of the links in the multiple paths based on routing protocol and forwarding logic.

According to some aspects, diagnostic data of all the devices in the network (e.g., Cores, Spines, Leafs, and Hosts) can be proactively monitored. In some instances, the diagnostic data can be collected by sensors distributed on the devices. The collected diagnostic data include dynamic environmental variables that may be changing and non-static depending on the internal state or surroundings of the device. The diagnostic data can depend on various factors relating to the device and the surrounding environment. Also, the diagnostic data can be relative parameters instead of an absolute value.

In some examples, the diagnostic data of each device in the network can pertain to environmental parameters such as physical characteristics of the surroundings of the devices. For example, the physical characteristics can include temperature, humidity, atmospheric pressure, elevation, altitude, wind speed, airborne particle concentration, gas concentration, and a combination thereof.

In some instances, the diagnostic data can be environmental parameters associated with electrical characteristics of the device (e.g., the internal state of the device) such as a power level, a power usage, a voltage, a signal-to-ratio, a temperature of components of the routing device, fan speeds, and a combination thereof.

In some examples, the diagnostic data can be environmental parameters associated with performance characteristics of the surroundings of the device including link errors, packet drops, a duplex mismatch, mismatching optical power levels, and a combination thereof.

In some instances, examples of the diagnostic data can include, but are not limited to customized user defined policies, a network design and role of the device in the network, traffic design and load conditions, system design, architecture, and implementations of hardware, application-specific integrated circuit (ASIC), and software components of the device, bandwidth/speed, a model, and capacity of the device.

According to some examples, such diagnostic data can be included in forwarding decisions along with existing algorithms or hashing logic to derive and steer the traffic (i.e., packets) through healthier end-to-end network paths in the network. Various implementations can be applied for the proactive and adaptive flow management based on the diagnostic data of the network devices (e.g., management and integration of end-to-end environmental health metrics in flow provisioning) as described further in detail below.

In some implementations, a forwarding decision can be made local to a given device and its next-hops through a link-level discovery protocol. Specifically, the diagnostic data including environmental metrics of a device can be exchanged between neighboring devices based on a Link Layer Discovery Protocol (LLDP) extension (e.g., optional type-length-value or tag-length-value extension). The diagnostic data can be locally integrated into link metrics and used by forwarding, hashing, and next-hop resolutions. Forwarding next-hop resolution based on the resultant link metric can dynamically eliminate next hop or neighboring devices with unhealthy metrics.

In other implementations, a control plane can be extended and included in flow provisioning and a forwarding decision. Specifically, the diagnostic data including environmental metrics can be carried along with next hops for routes in an extension of a Multi-Protocol Border Gateway Protocol (MP-BGP) (i.e., through an MP-BGP Multicast Virtual Private Network (MVPN) control plane). As follows, alternative paths (i.e., next-hop) on receiving nodes can be derived based on the diagnostic data (e.g., by routing engines and forwarding tables).

In other implementations, flow provisioning based on the environmental health metrics can be managed by a centralized network controller (e.g., centralized telemetry drive controller). A network controller can collect diagnostic data along with other network insights and proactively manage new flow provisioning. Specifically, a network controller (e.g., controller 214 illustrated in FIG. 2) can collect, monitor, and manage the diagnostic data including environmental metrics through software or hardware telemetry streamed from network elements integrated with network insights. As follows, the network controller can regulate and provision policy-based prioritized flows in an end-to-end coordinated fashion.

In some examples, forwarding and steering flows can be differentiated or classified based on priorities or policies. For example, based on network policies or rules, subsets of traffic flows (i.e., a portion of traffic or packets such as select critical application traffic or flows) can be prioritized. Based on the priorities, each of the subsets of the traffic flows can be routed over the network paths.

Referring to FIG. 3, based on the diagnostic data, the health condition of the devices (e.g., Cores, Spines, Leafs, and Hosts) can be determined. In some instances, the diagnostic data of the device can be compared with a predetermined threshold. Based on the various implementations, the health condition of each device on the network paths can be determined, more specifically, can be compared against the predetermined threshold. In some instances, the base healthy stable sate and threshold, which may be specific to a given device can be defined in a data sheet by vendors based on the bandwidth/speed, capacity, model, system design, and other various factors that impact those values. The data sheet can be used as a reference for a heathy base or thresholds to compare against the diagnostic data of a given device.

For example, the diagnostic data of Core-1 302-1 or Spine-1 304-1 can indicate, when compared with a predetermined threshold, an unhealthy status of the device (e.g., a potential hard failure of the device). In the local device scope, for example, LLDP notifications can be triggered based on the comparison between the diagnostic data of the device and the predetermined threshold to the neighboring devices.

Furthermore, different threshold ranges can be defined and mapped to different levels. Instead of waiting until a critical threshold is reached, proactive and adaptive actions can be taken at the receiving devices (i.e., nodes) based on the threshold ranges and metric mapping.

Further, based on the comparison between the diagnostic data of the device and the predetermined threshold, prior to a failure of the device, the routing path can be proactively and adaptively modified to bypass the device for a portion of or entire traffic flows. For example, once Core-1 302-1 is determined unhealthy or failing, it can be pruned by its neighboring devices (e.g., Spine-1 304-2, Spine-n 302-*n*, Spine-1 314-1, or Spine-n 314-*n*) so that the network flow is modified to reroute the traffic to a healthier device such as Core-n 302-*n*.

Similarly, referring to FIG. 3, based on the comparison between the diagnostic data of Spine-1 304-1 and the predetermined threshold, Spine-1 304-1 can be determined unhealthy. A network path can be updated to prune Spine-1 304-1 or steer a portion of or entire incoming traffic flows to another device such as Spine-n 304-*n*. As follows, Leaf-1 306-1, Leaf-2 306-2, and Leaf-n 306-*n* forward their traffic to Spine-n 304-*n* instead of Spine-1 304-1.

Figure 4:
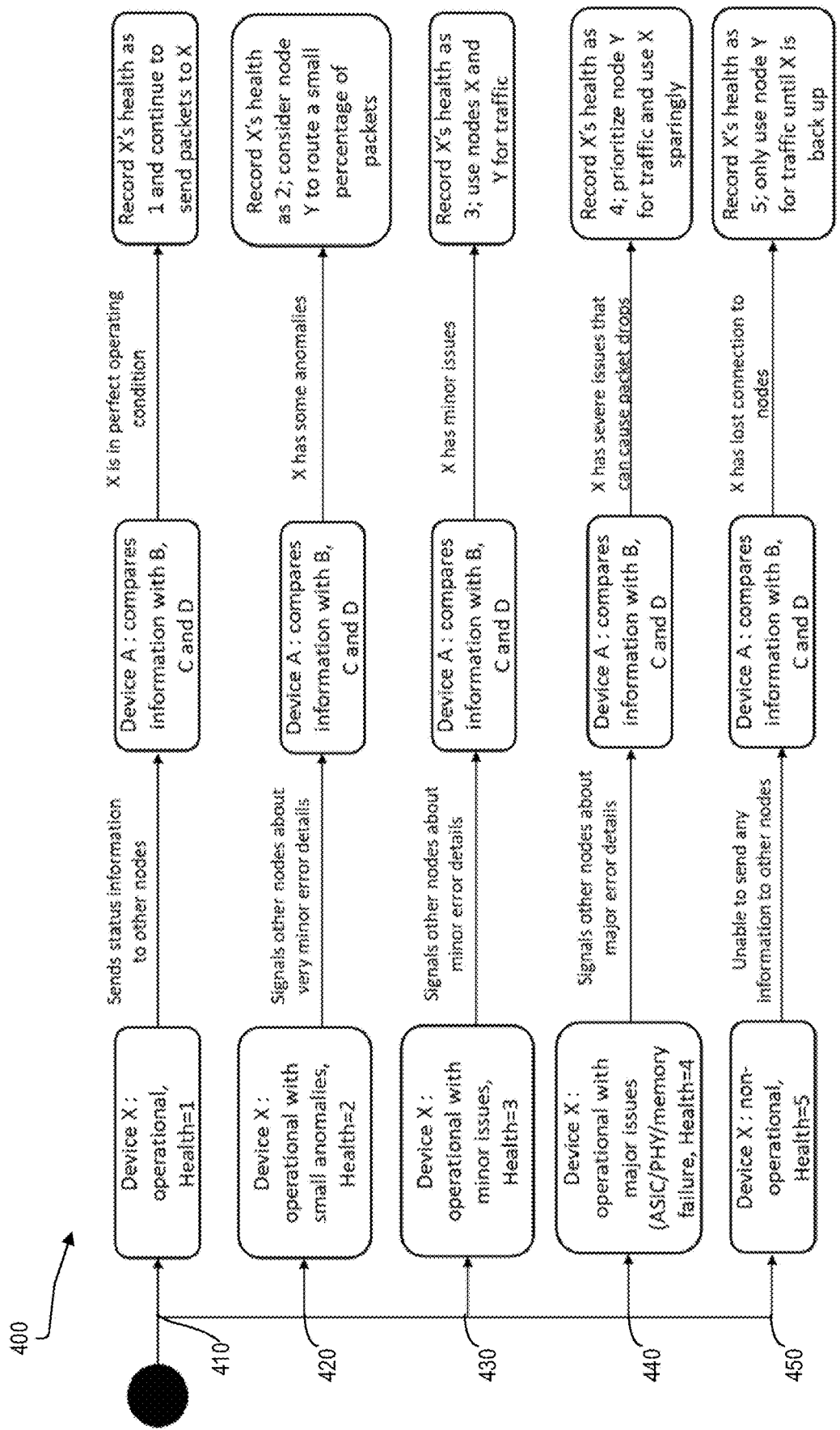
FIG. 4 illustrates an example diagram of a data exchange between devices according to some examples of the present disclosure.

FIG. 4 illustrates an example diagram 400 of data exchange between devices according to some examples of the present disclosure. In FIG. 4, Cases 410, 420, 430, 440, and 450 show various decisions made by neighboring devices (e.g., Devices A, B, C, and D) depending on the diagnostic data of Device X. In Case 410, Device X is operational. Device X can send status information to other nodes. Device A, once it receives the status information, can compare the information with Devices B-D. As Device X is in perfect operating condition, Devices A-D can record Device X's health condition and continue to send packets to Device X.

In Case 420, Device X is operational with small anomalies. Then, Device X can signal other nodes about the minor error details. Device A can compare the information with Devices B-D. As Device X has some anomalies, Devices A-D can record Device X's health condition and consider Device Y to route a portion of packets (e.g., a small percentage of packets).

In Case 430, Device X is operational with minor issues. Device X can signal other nodes about minor error details. Then, Device A can compare the information with Devices B-D. As Device X has minor issues, Devices A-D can record Device X's health condition and split incoming traffic to route it to Devices X and Y.

In Case 440, Device X is operational with major issues (e.g., ASIC/PHY/memory failure). Device X can signal other nodes about major error details. Device A can compare such information with Devices B-D. As Device X has severe issues that can cause packet drops, prior to a failure of Device X, Devices A-D can record Device X's health condition and prioritize Device Y for traffic and use Device X sparingly.

In Case 450, Device X is non-operational and unable to send any information to other nodes. Absent any health condition information from Device X, Device A can compare connection loss information with Devices B-D. Devices A-D can record Device's X health condition and only use Device Y for traffic until Device X is back up.

In some embodiments, as shown in Cases 410-450, devices (e.g., Devices X and A-D) can be configured to share diagnostic data of other devices. Such correlating data between network devices can provide insights into the location or propagation of a potential failure, help identify failing devices, and trigger alarms to repair the device. Furthermore, the other devices can bypass the failing device until the issue is resolved. In some instances, the data transfer can occur automatically between nodes (e.g., devices) by using encryption to prevent unauthorized users from accessing it.

In some examples, devices (e.g., Devices X and A-D as shown in FIG. 4) in the network can communicate their diagnostic data to each other. The diagnostic data can include device information (e.g., persistent identifier (PID), serial number, hardware/software/firmware versions), environmental data (e.g., component temperatures, power, voltages, or fan speeds), platform data (e.g., boot Power-On-Self-Test (POST) codes, the status of programmable devices, the status of line cards/assemblies within the device if applicable), and diagnostic data (e.g., any error messages arising from internal components like forwarding Application Specific Integrated Circuit (ASIC), physical layer (PHY), Solid State Drive (SSD), Central Processing Unit (CPU), Clocks or Field Programmable Gate Arrays (FPGAs), which can cause packet loss during internal forwarding).

In some implementations, a network discovery protocol can allow a device to view information of its neighbors. The information can include Device ID, IP, vLAN data, hardware information (e.g., part number and/or model number), and software information (e.g., software version). In some examples, the network discovery protocol can convey information regarding network topology, inventory management, emergency services, VLAN configuration, and power negotiation to its neighboring devices.

The advantages of having diagnostic data shared between devices can include but are not limited to a reduced downtime in case of a failure of a device, improved failure management in the network, and prevention of hard failures by finding trends in collated data. Prior to any failure of any devices, incoming traffic can be split between routes based on the health of the devices in the network.

Figure 5:
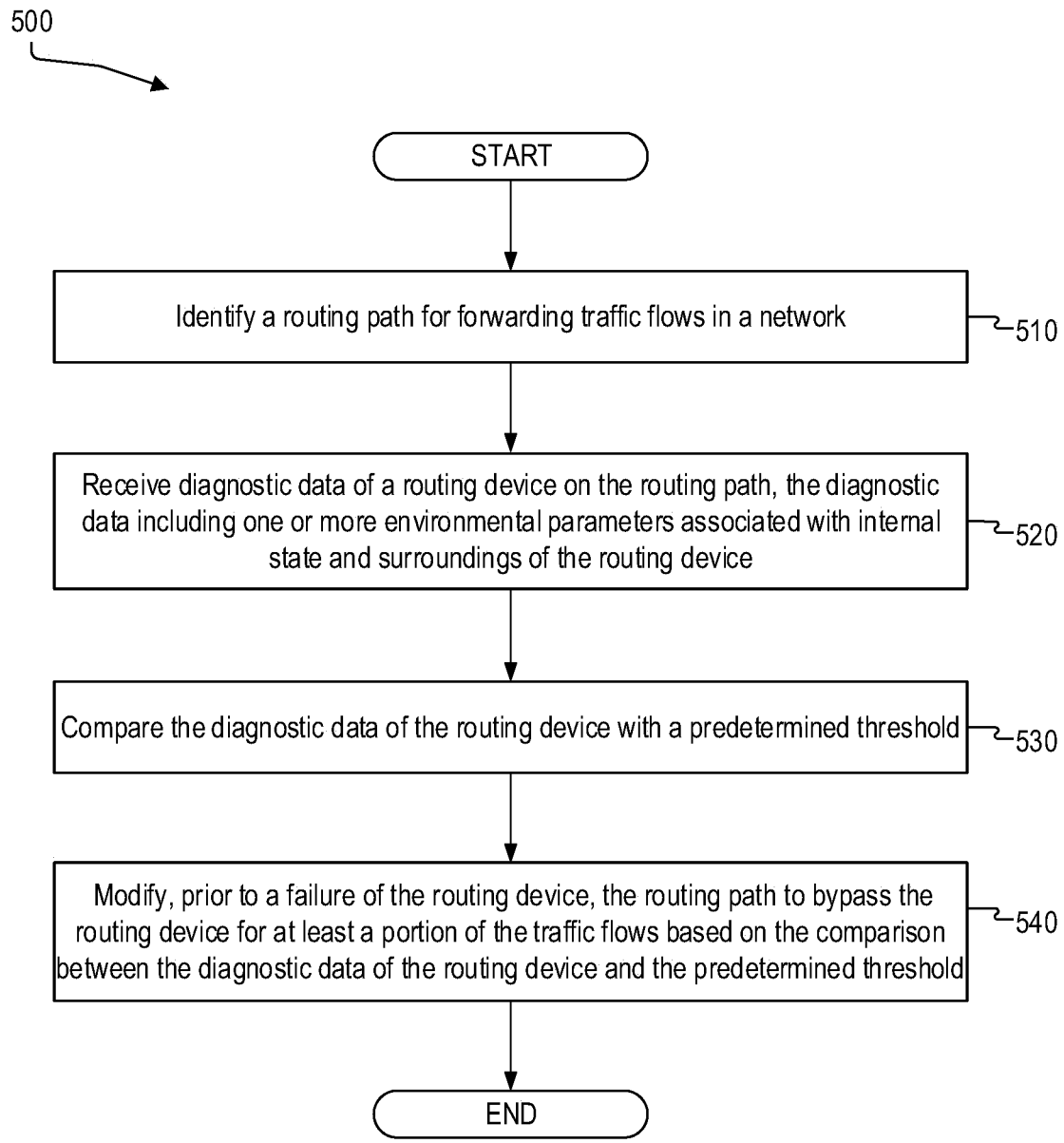
FIG. 5 illustrates an example method of proactively and adaptively rerouting data to healthier paths through a network according to some examples of the present disclosure.

FIG. 5 is a flowchart of an example method 500 of proactively and adaptively rerouting data to healthier paths through a network, as part of flow provisioning, based on environmental variables associated with devices in the network. Although example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements the method 500 may perform functions at substantially the same time or in a specific sequence.

According to some examples, at step 510, method 500 includes identifying a routing path for forwarding traffic flows in a network. For example, a network controller (e.g., controller 214 illustrated in FIG. 2) can identify a routing path for forwarding traffic flow in a network (e.g., from Core-1 302-1 to Host-1 308-1 or from Core-1 302-1 to Host-2 308-2 as illustrated in FIG. 2).

According to some examples, at step 520, method 500 includes receiving diagnostic data of a routing device on the routing path. The diagnostic data include one or more environmental parameters associated with the internal state and surroundings of the routing device. For example, a network controller (e.g., controller 214 illustrated in FIG. 2) can receive diagnostic data of a routing device on the routing path where the diagnostic data include environmental parameters associated with the internal state and surroundings of the routing device.

In some instances, the diagnostic data is obtained from one or more sensors distributed on the routing device.

In some examples, the one or more environmental parameters are physical characteristics of the surroundings of the routing device including at least one of a temperature, humidity, an atmospheric pressure, an elevation, an altitude, a wind speed, an airborne particle concentration, a gas concentration, and a combination thereof.

In some instances, the one or more environmental parameters are electrical characteristics of the routing device including at least one of a power level, a power usage, a voltage, a signal-to-ratio, a temperature of components of the routing device, fan speeds, and a combination thereof.

In some examples, wherein the one or more environmental parameters are performance characteristics of the surroundings of the routing device including at least one of link errors, packet drops, a duplex mismatch, mismatching optical power levels, and a combination thereof.

According to some examples, at step 530, method 500 includes comparing the diagnostic data of the routing device with a predetermined threshold. For example, network controller (e.g., controller 214 illustrated in FIG. 2) can compare the diagnostic data of the routing device with a predetermined threshold.

According to some examples, at step 540, method 500 includes modifying, prior to a failure of the routing device, the routing path to bypass the routing device for at least a portion of the traffic flows based on the comparison between the diagnostic data of the routing device and the predetermined threshold. For example, a network controller (e.g., controller 214 illustrated in FIG. 2) can modify, prior to a failure of the routing device, the routing path to bypass the routing device for at least portion of the traffic flows based on the comparison between the diagnostic data of the routing device and the predetermined threshold.

In some examples, the portion of the traffic flows is determined based on a network policy. Routing devices can be configured to apply network policies or rules. Network policies and rules can be driven by a network controller (e.g., controller 214 illustrated in FIG. 2) and/or implemented or enforced by one or more devices such as Leafs 204 as illustrated in FIG. 2.

According to some aspects, method 500 further includes facilitating an exchange of the diagnostic data between a first routing device on the routing path and a second routing device on the routing path based on a link layer discovery protocol (LLDP) extension. For example, a network controller (e.g., controller 214 illustrated in FIG. 2) can facilitate an exchange of the diagnostic data between devices (e.g., Cores, Spines, Leafs, and Hosts as shown in FIG. 2) on the routing path based on an LLDP extension. For example, the diagnostic data can be included in the LLDP extension as an optional TLV extension to be exchanged across neighboring devices.

According to some instances, method 500 includes delivering the diagnostic data of the routing device to other devices in the network based on a Multi-Protocol Border Gateway Protocol (MP-BGP) extension. For example, a network controller (e.g., controller 214 illustrated in FIG. 2) can facilitate the delivery of the diagnostic data of the routing device to other devices via an MP-BGP extension.

According to some examples, method 500 further includes comparing the diagnostic data of the routing device with diagnostic data of other devices in the network. Further, method 500 includes updating a routing protocol in the network based on the comparison between the diagnostic data of the routing device and the diagnostic data of the other devices, the routing protocol including links between the routing device and the other devices. For example, a network controller (e.g., controller 214 illustrated in FIG. 2) can compare the diagnostic data of each of the routing devices in the network and update a routing protocol based on the comparison. For example, a network controller (e.g., controller 214 illustrated in FIG. 2) can prioritize or rank the health condition of each of the devices based on the diagnostic data and modify the network paths.

According to some aspects, method 500 includes prioritizing subsets of the traffic flows based on a network policy.

Also, method 500 includes modifying the routing path for each of the subsets of the traffic flows based on the diagnostic data of the routing device. For example, a network controller (e.g., controller 214 illustrated in FIG. 2) can prioritize subsets of the traffic flows based on a network policy and modify the routing path for each of the subsets of the traffic flows based on the diagnostic data.

Figure 6:
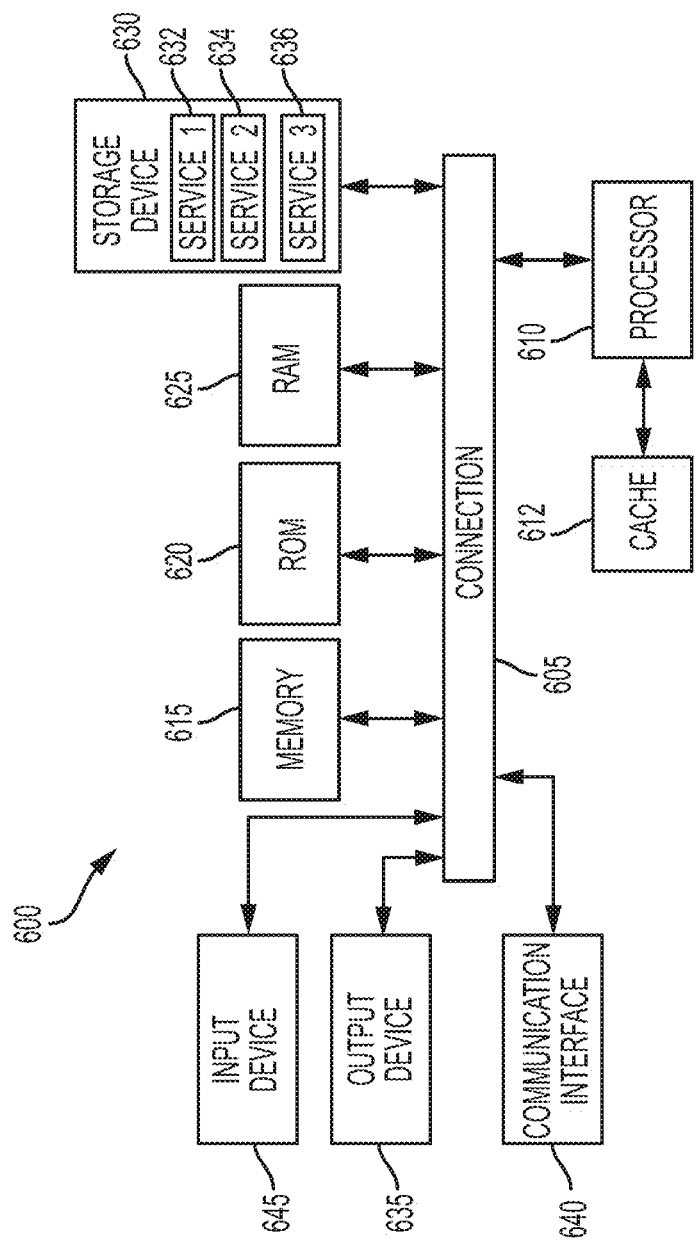
FIG. 6 shows an example computing system, which can be for example any computing device that can implement components of the system.

FIG. 6 illustrates an example computing system 600 including components in electrical communication with each other using a connection 605 upon which one or more aspects of the present disclosure can be implemented. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple datacenters, a peer network, etc. In some instances, one or more of the described system components represents many such components each performing some or all of the function for which the component is described. In some examples, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some examples, a hardware service that performs a particular function can include the software component stored in a computer-readable medium in connection with the necessary hardware components, such as processor 610, connection 605, output device 635, etc., to carry out the function.

Figure 7:
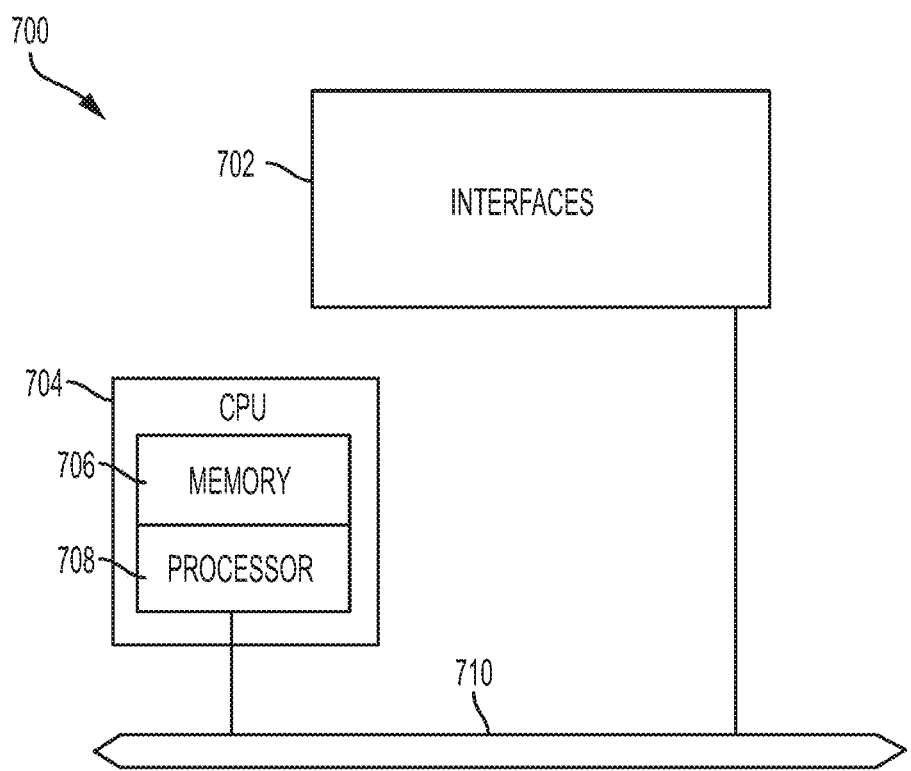
FIG. 7 illustrates an example network device according to some examples of the present disclosure.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   determining, at a routing device on an existing routing path for forwarding traffic flows in a network, diagnostic data of the routing device, the diagnostic data including at least one or more environmental conditions of a physical environment in which the routing device is located;
   receiving, at the routing device, respective diagnostic data of at least one neighboring routing device on the routing path;
   comparing, on the routing device, the diagnostic data of the routing device and the respective diagnostic data of the at least one neighboring routing device, with a predetermined threshold to determine a device assessment for the routing device;
   ranking, on the routing device, the device assessment of the routing device relative to a respective device assessment of each of the at least one neighboring routing device to yield a ranking; and
   proactively modifying, locally on the routing device and prior to a failure of the routing device, the routing path to bypass the routing device or one or more of the at least one neighboring routing device for at least a portion of the traffic flows based on the device assessment and the ranking.

2. The method of claim 1, further comprising:
   facilitating an exchange of the diagnostic data and the respective diagnostic data of the at least one neighboring routing device based on a link layer discovery protocol (LLDP) extension.

3. The method of claim 1, further comprising:
   facilitating an exchange of the diagnostic data and the respective diagnostic data of the at least one neighboring routing device based on a Multi-Protocol Border Gateway Protocol (MP-BGP) extension.

4. The method of claim 1, further comprising:
updating a routing protocol in the network based on comparing the diagnostic data of the routing device and the respective diagnostic data of the at least one neighboring routing device, the routing protocol including links between the routing device and the at least one neighboring routing device.

5. The method of claim 1, further comprising:
prioritizing subsets of the traffic flows based on a network policy; and
modifying the routing path for each of the subsets of the traffic flows based on the diagnostic data of the routing device.

6. The method of claim 1, wherein the one or more environmental conditions include at least one of a temperature, a humidity, an atmospheric pressure, an elevation, an altitude, a wind speed, an airborne particle concentration, a gas concentration, and a combination thereof, of the physical environment.

7. The method of claim 1, wherein the diagnostic data further include respective electrical characteristics of the routing device and the at least one neighboring routing device including at least one of a power level, a power usage, a voltage, a signal-to-ratio, a temperature of components of the routing device, fan speeds, customized user defined policies, network design and role of the device, traffic design and load conditions, a bandwidth, a capacity, a model, a system design and implementation of hardware and software components of the device, and a combination thereof.

8. The method of claim 1, wherein the diagnostic data further include respective performance characteristics of the at least one neighboring routing device including at least one of link errors, packet drops, a duplex mismatch, mismatching optical power levels, and a combination thereof.

9. The method of claim 1, wherein the diagnostic data is obtained from one or more sensors distributed on the routing device.

10. The method of claim 1, wherein the portion of the traffic flows is determined based on a network policy.

11. A system comprising:
a plurality of routing devices, each routing device including:
one or more processors; and
a computer-readable medium comprising instructions stored therein, which when executed by the one or more processors, cause the one or more processors to:
determine, at a routing device on an existing routing path for forwarding traffic flows in a network, diagnostic data of the routing device, the diagnostic data including at least one or more environmental conditions of a physical environment in which the routing device is located;
receive, at the routing device, respective diagnostic data of at least one neighboring routing device on the routing path;
compare, on the routing device, the diagnostic data of the routing device and the respective diagnostic data of the at least one neighboring routing device, with a predetermined threshold to determine a device assessment for the routing device;
rank, on the routing device, the device assessment of the routing device relative to a respective device assessment of each of the at least one neighboring routing device to yield a ranking; and
proactively, modify, locally on the routing device and prior to a failure of the routing device, the routing path to bypass the routing device or one or more of the at least one neighboring routing device for at least a portion of the traffic flows based on the device assessment and the ranking.

12. The system of claim 11, wherein the instructions, which when executed by the one or more processors, further cause the one or more processors to:
facilitate an exchange of the diagnostic data and the respective diagnostic data of the at least one neighboring routing device based on a link layer discovery protocol (LLDP) extension.

13. The system of claim 11, wherein the instructions, which when executed by the one or more processors, further cause the one or more processors to:
facilitate an exchange of the diagnostic data and the respective diagnostic data of the at least one neighboring routing device based on a Multi-Protocol Border Gateway Protocol (MP-BGP) extension.

14. The system of claim 11, wherein the instructions, which when executed by the one or more processors, further cause the one or more processors to:
update a routing protocol in the network based on comparing the diagnostic data of the routing device and the respective diagnostic data of the at least one neighboring routing device, the routing protocol including links between the routing device and the at least one neighboring routing device.

15. The system of claim 11, wherein the instructions, which when executed by the one or more processors, further cause the one or more processors to:
prioritize subsets of the traffic flows based on a network policy; and
modify the routing path for each of the subsets of the traffic flows based on the diagnostic data of the routing device.

16. A non-transitory computer-readable storage medium comprising computer-readable instructions, which when executed by a routing device, cause the routing device to:
determine, at a routing device on an existing routing path for forwarding traffic flows in a network, diagnostic data of the routing device, the diagnostic data including at least one or more environmental conditions of a physical environment in which the routing device is located;
receive, at the routing device, respective diagnostic data of at least one neighboring routing device on the routing path;
compare, on the routing device, the diagnostic data of the routing device and the respective diagnostic data of the at least one neighboring routing device, with a predetermined threshold to determine a device assessment for the routing device;
rank, on the routing device, the device assessment of the routing device relative to a respective device assessment of each of the at least one neighboring routing device to yield a ranking; and
proactively, modify, locally on the routing device and prior to a failure of the routing device, the routing path to bypass the routing device or one or more of the at least one neighboring routing device for at least a portion of the traffic flows based on the device assessment and the ranking.

17. The non-transitory computer-readable storage medium of claim 16, wherein the instructions, which when executed by the routing device, further cause the routing device to:
facilitate an exchange of the diagnostic data and the respective diagnostic data of the at least one neighboring routing device based on a link layer discovery protocol (LLDP) extension.

18. The non-transitory computer-readable storage medium of claim 16, wherein the instructions, which when executed by the routing device, further cause the routing device to:
facilitate an exchange of the diagnostic data and the respective diagnostic data of the at least one neighboring routing device based on a Multi-Protocol Border Gateway Protocol (MP-BGP) extension.

19. The non-transitory computer-readable storage medium of claim 16, wherein the instructions, which when executed by the routing device, further cause the routing device to:
update a routing protocol in the network based comparing the diagnostic data of the routing device and the respective diagnostic data of the at least one neighboring routing device, the routing protocol including links between the routing device and the at least one neighboring routing device.

20. The non-transitory computer-readable storage medium of claim 16, wherein the instructions, which when executed by the routing device, further cause the routing device to:
prioritize subsets of the traffic flows based on a network policy; and
modify the routing path for each of the subsets of the traffic flows based on the diagnostic data of the routing device.

* * * * *